United States Patent Office.

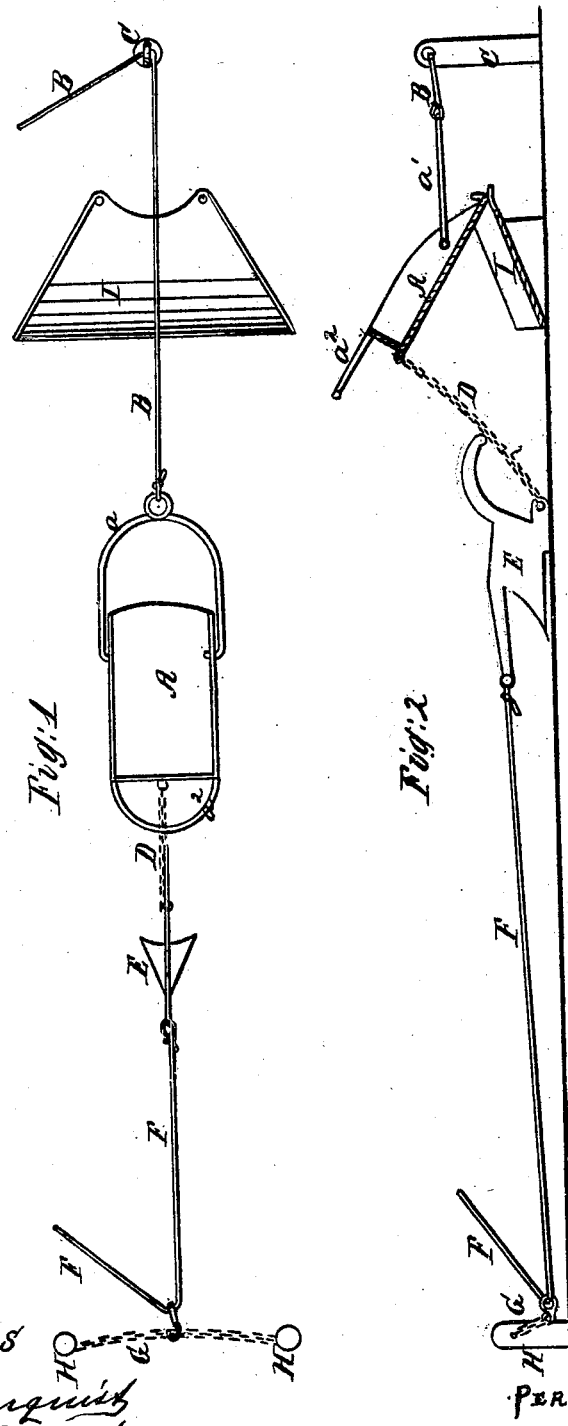

PHILO W. CLARK, OF OBLONG, NEW YORK.

Letters Patent No. 102,492, dated May 3, 1870.

IMPROVEMENT IN EXCAVATING APPARATUS.

The Schedule referred to in these Letters Patent and making part of the same.

*To all whom it may concern:*

Be it known that I, PHILO W. CLARK, of Oblong, in the county of Dutchess and State of New York, have invented a new and useful Improvement in Excavating Apparatus; and I do hereby declare that the following is a full, clear, and exact description thereof, which will enable others skilled in the art to make and use the same, reference being had to the accompanying drawings forming part of this specification, in which—

Figure 1 is a top or plan view of my improved excavating apparatus.

Figure 2 is a detail side view of the same, partly in section, to show the construction.

Similar letters of reference indicate corresponding parts.

My invention has for its object to furnish an improved excavating apparatus, designed for use in transferring the soil from the place being excavated, and loading it upon a cart or throwing it down an embankment; and It consists in the construction and combination of various parts of the apparatus, as hereinafter more fully described.

A represents an ordinary scraper, of which $a^1$ is the bail, and $a^2$ is the handle.

To the eye of the bail $a^1$ is attached one end of the rope or chain B, which passes through a hole formed in or around a pulley connected with, or pivoted to, a post, C. The other end of the rope or chain B is attached to a horse-power or other power.

To the middle part of the rear end of the scraper A, is attached one end of a short chain, D, the other end of which is attached to the tail end of an ordinary plow, E, or other tool for loosening the soil.

To the forward end of the plow E is attached one end of the rope or chain F, which passes around a pulley or through the eye of a hook, hooked into the chain G.

The other end of the rope or chain F, is attached to a horse-power or other suitable power.

The ends of the chain G are attached to two posts H, firmly set in the ground.

By this construction, when the apparatus is drawn in one direction the soil will be loosened by the plow E, and, as it is drawn in the other direction, the soil will be collected in the scraper A and carried off, the relative positions of said scraper and plow enabling the same man to operate both, as they are alternately used.

The ropes or chains B and F, may be attached to my improved horse-power or any other suitable machine, and should be so arranged that the draft may be shifted from the one to the other of said ropes or chains, without changing the direction of the power.

The posts C and H should be shifted as the excavating progresses, and the point at which the rope or chain F is connected with the chain G, may be shifted from point to point along said chain G.

I is a guide-platform, inclined or not, as the circumstances of the case may render advisable, staked or otherwise secured to the ground at the end of the excavation, in such a position that the full scraper A will be drawn up it.

The sides of the platform I project upward, and are so inclined as to guide the loaded scraper into the proper position for dumping.

The forward side of the platform I should be so elevated that a cart may be driven under it to receive the dirt from the scraper.

The forward part of the platform I may be a little inclined downward, to bring the loaded scraper into a more favorable position for dumping, and should be provided with posts or other suitable stops for the forward end of the loaded scraper to strike against, to cause it to dump its load.

In cases where the soil is so loose as not to require to be loosened, two scrapers may be connected with each other in such a way that the empty scraper may be drawn back while the full one is being drawn forward, or two scrapers and two plows may be thus connected.

Having thus described my invention,

I claim as new and desire to secure by Letters Patent—

1. The combination of a scraper, A, plow E, draft-ropes B and F, chain G, and stay-posts C and H, with each other, substantially as herein shown and described, and for the purpose set forth.

2. An apparatus consisting essentially of a plow, earth-collector, and inclined plane, each arranged with respect to the others, as specified, whereby on its forward movement the earth is loosened, while on its return movement it is gathered and carried up to a point where it may be readily dumped into any receptacle prepared for it.

PHILO W. CLARK.

Witnesses:
GEO. W. MABEE,
JAMES T. GRAHAM.